_US005294648A_

United States Patent [19]

Smith et al.

[11] Patent Number: 5,294,648
[45] Date of Patent: Mar. 15, 1994

[54] ALKALINE RESOL PHENOL-ALDEHYDE RESIN BINDER COMPOSITION

[75] Inventors: Garry Smith, Sutton Coldfield; Martin Bradley, Solihull, both of England

[73] Assignee: Foseco International Limited, Birmingham, England

[21] Appl. No.: 565

[22] Filed: Jan. 4, 1993

Related U.S. Application Data

[63] Continuation of Ser. No. 833,695, Feb. 11, 1992, abandoned.

[30] Foreign Application Priority Data

Mar. 13, 1991 [GB] United Kingdom ............... 9105312

[51] Int. Cl.$^5$ ........................... C08J 5/14; B22C 1/16
[52] U.S. Cl. ...................................... 523/145; 523/146; 523/147; 528/138
[58] Field of Search .................... 523/145, 146, 147; 528/138

[56] References Cited

U.S. PATENT DOCUMENTS

| | | | |
|---|---|---|---|
| 4,097,443 | 6/1978 | Nakamura et al. | 260/38 |
| 4,452,927 | 6/1984 | Matsushima et al. | 523/147 |
| 4,780,489 | 10/1988 | Dunnavant et al. | 523/147 |
| 4,977,209 | 12/1990 | Barker et al. | 528/138 |
| 4,985,489 | 1/1991 | Barker et al. | 528/138 |
| 5,162,393 | 11/1992 | Griffin et al. | 523/145 |

FOREIGN PATENT DOCUMENTS

| | | |
|---|---|---|
| 0323096 | 7/1989 | European Pat. Off. |
| 4-147743 | 5/1992 | Japan. |
| 8808862 | 11/1988 | World Int. Prop. O. ......... 523/147 |

OTHER PUBLICATIONS

Rose, Aurthur & Elizabeth, The Condensed Chemical Dictionary, 7th Ed, Van Nostrand Reinholl Co., pp. 393-394 1969.

Primary Examiner—John Kight, III
Assistant Examiner—Richard Lee Jones
Attorney, Agent, or Firm—Nixon & Vanderhye

[57] ABSTRACT

A binder composition for producing articles of bonded particulate material such as foundry molds or core comprises an alkaline aqueous solution of a resol phenol-aldehyde resin, an oxyanion which can form a stable complex with the resin, and an ethylene glycol monoalkyl ether. The binder composition has an alkali to phenol molar ratio of from 1.5:1 to 2.5:1 and the amount of alkali present in the solution is sufficient to substantially prevent stable complex formation between the resin ad the oxyanion. Bonded articles are produced by passing carbon dioxide gas through articles formed from a mixture of particulate material and the binder composition so as to produce stable complex formation and curing of the resin.

14 Claims, No Drawings

ALKALINE RESOL PHENOL-ALDEHYDE RESIN BINDER COMPOSITION

This is a continuation of application Ser. No. 07/833,695, filed Feb. 11, 1992, now abandoned.

This invention relates to alkaline resol phenol-aldehyde binder compositions and their use in the production of articles of bonded particulate material such as foundry moulds or cores.

U.S. Pat. Nos. 4,985,489 and 4,977,209 describes a binder composition comprising an alkaline aqueous solution of a resol phenol-aldehyde resin and an oxyanion which can form a stable complex formation between the resin and the oxyanion. U.S. Pat. Nos. 4,985,489 and 4,977,209 also describes a process for the production of an article of bonded particulate material, such as a foundry mould or core, in which a mixture of particulate material and the binder composition is formed to a desired shape, and carbon dioxide gas is then passed through the formed shape so as to cause the oxyanion to form a stable complex with the resin and thereby to cure the resin.

It has now been found that the performance of the binder composition can be improved if the binder composition also contains an ethylene glycol monoalkyl ether.

According to the present invention there is provided a binder composition comprising an alkaline aqueous solution of a resol phenol-aldehyde resin and an oxyanion which can form a stable complex with the resin, the amount of alkali present in the solution being sufficient to substantially prevent stable complex formation between the resin and the oxyanion, wherein the molar ratio of alkali to phenol is from 1.5:1 to 2.5:1 and the binder composition also contains an ethylene glycol monoalkyl ether.

According to a further feature of the invention there is provided a process for the production of an article of bonded particulate material comprising forming to the desired shape a mixture of particulate material and a binder composition comprising an alkaline aqueous solution of a resol phenol-aldehyde resin having an alkali to phenol molar ratio of from 1.5:1 to 2.5:1, an oxyanion which can form a stable complex with the resin, and an ethylene glycol monoalkyl ether, and passing carbon dioxide gas through the formed shape so as to cause the oxyanion to form a stable complex with the resin, and thereby to cure the resin.

The binder composition and the process of the invention are of particular value for making foundry moulds and cores and it is with reference to that application that the invention will be described.

Suitable phenol-aldehyde resins and oxyanions for use in the binder compositions of the invention, and suitable methods for producing the phenol-aldehyde resin are described in U.S. Pat. Nos. 4,985,489 and 4,977,209 the disclosure of which is incorporated herein by reference.

Examples of suitable ethylene glycol monoalkyl ethers include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether and polyethylene glycol monomethyl ethers. Diethylene glycol monoalkyl ethers and triethylene glycol monoalkyl ethers are preferred. The optimum amount of ethylene glycol monoalkyl ether contained in the binder composition will vary depending on the composition of the resin and on the particular ethylene glycol monoalkyl ether used, but will usually be within the range of 1% -10% by weight, preferably 2-5%, based on the weight of the binder composition. The presence of the ethylene glycol monoalkyl ether may have one or more beneficial effects on the performance of the binder composition as a binder for making foundry moulds and cores, depending on the composition of the particular resin and the particular ethylene glycol monoalkyl ether used.

The beneficial effects include:
 (i) improved mould or core strength immediately after gassing with carbon dioxide gas.
 (ii) improved strength after gassed moulds or cores have been stored before use, for example for up to 24 hours or longer.
 (iii) improved strength of moulds or cores which have been coated with an alcohol based coating which has been dried by burning off the alcohol, prior to storage of the moulds or cores
 (iv) improved mixed sand flowability.
 (v) improved mould or core surface finish and edge hardness.

The binder composition of the invention preferably also contains a silane such as gamma-aminopropyltriethoxysilane, N-(2-aminoethyl)-3-aminopropyltrimethoxysilane, phenol trimethoxysilane or gamma-glycidoxypropyltrimethoxysilane usually in an amount of 0.2% to 1.0% by weight based on the weight of the binder composition.

The following Examples will serve to illustrate the invention:

EXAMPLE 1

A resol phenol-formaldehyde resin was synthesised having the following composition:

| | |
|---|---|
| phenol | 800.00 g |
| 91% W/W paraformaldehyde | 642.20 g |
| 50% W/W sodium hydroxide solution | 40.85 g |
| F:P molar ratio | 2.3:1 |
| OH:P molar ratio | 0.06:1 |
| Water in starting composition | 5.2% W/W |

The following procedure was used:
1. Charge and melt phenol
2. Charge paraformaldehyde and part of the sodium hydroxide solution and heat to 60°-65° C. at a rate of 1° C. per minute
3. Cool to counteract exothermic reaction and maintain at 60°-65° C. while adding the remainder of the sodium hydroxide solution over a period of 1 hour
4. Heat to 75° C. at a rate of 1° C. per minute
5. Maintain at 75° C. for 30 minutes
6. Heat to 85° C. at a rate of 1° C. per minute
7. Maintain at 85° C. for sufficient time for the resin to reach a viscosity of 4000-6000 cp at 25° C. as measured on a 25 g sample diluted with 15 g of 50% w/w potassium hydroxide solution using Paint Research Association Bubble Viscosity Tubes.

The resin was used to produce a base binder (1A) having the following composition by weight:

| | |
|---|---|
| resin | 25 parts |

-continued

| | |
|---|---|
| 50% W/W potassium hydroxide solution | 35 parts |
| borax | 5.5 parts |
| gamma aminopropyltriethoxysilane | 0.39 parts |

The potassium hydroxide solution was added to the resin, the temperature rise due to exothermic reaction was controlled and the resin was cooled. The borax was added and mixed into the resin until it had dissolved. The silane was then added at a temperature of below 30° C. The molar ratio of alkali to phenol in the base binder was approximately 2:1.

Using some of the base binder 1 a series of binders 2–5 was produced consisting of 98% by weight base binder 1 and 2% by weight of an ethylene glycol monoalkyl ether as follows:

| Binder | Ethylene glycol monoalkyl ether |
|---|---|
| 2 | Monoethylene glycol monomethyl ether |
| 3 | Monoethylene glycol monoethyl ether |
| 4 | Monoethylene glycol monobutyl ether |
| 5 | Diethylene glycol monomethyl ether. |

Binders 1–5 were tested as binders for foundry sand using the following procedure:

3% by weight of the binder based on the weight of sand was mixed with CHELFORD 60 silica sand (AFS Fineness No. 62) and the mixture was used to prepare standard AFS 50 mm×50 mm diameter cylindrical cores. The sand temperature was 19°–20° C. The cores were hardened by the passage of carbon dioxide gas for various times at 0.35 kg/cm² line pressure and a 6.0 liters per minute flow rate.

Some of the cores were tested immediately after gassing on a George Fischer Universal Strength Machine Type PFA fitted with a High-Dry Compressive Strength Attachment Type PHD. Some were tested after storage for 3 days in dry storage conditions (temperature 18°–20° C., relative humidity 40–45%) and others were tested after storage for 3 days in humid storage conditions (temperature 24°–26° C., relative humidity 75–80%).

The results obtained are tabulated in Tables 1 and 2 below.

TABLE 1

| | COMPRESSION STRENGTH (kg/cm²) FOR GASSING TIME | | |
|---|---|---|---|
| BINDER | 30S | 60S | 120S |
| 1 | 13.8 | 15.9 | 18.8 |
| 2 | 15.4 | 19.8 | 20.6 |
| 3 | 16.2 | 21.3 | 23.9 |
| 4 | 17.8 | 18.6 | 23.0 |
| 5 | 18.3 | 21.4 | 24.5 |

TABLE 2

| | COMPRESSION STRENGTH (kg/cm²) AFTER DRY STORAGE FOR GASSING TIME | | | COMPRESSION STRENGTH (kg/cm²) AFTER HUMID STORAGE FOR GASSING TIME | | |
|---|---|---|---|---|---|---|
| BINDER | 30S | 60S | 120S | 30S | 60S | 120S |
| 1 | 20.7 | 21.3 | 20.5 | 20.3 | 20.3 | 20.3 |
| 2 | 20.5 | 23.6 | 25.0 | 22.5 | 23.8 | 24.7 |
| 3 | 23.9 | 25.0 | 25.7 | 24.6 | 22.8 | 23.8 |
| 4 | 28.0 | 28.6 | 28.3 | 22.9 | 26.9 | 25.9 |
| 5 | 31.0 | 32.7 | 33.6 | 30.0 | 29.4 | 29.4 |

As Tables 1 and 2 show, all the resins containing an ethylene glycol monoalkyl ether gave improved strength results overall compared with the base resin and diethylene glycol monoethyl ether was better than the monoethylene glycol monoalkyl ethers.

EXAMPLE 2

A series of binders 6–9 was prepared, similar to binders 2–4 but each containing 5% by weight of the ethylene glycol monoalkyl ether instead of 2%.

The binders were tested together with base binder 1 as described in Example 1 and the results obtained are tabulated in Tables 3 and 4 below.

TABLE 3

| | COMPRESSION STRENGTH (kg/cm²) FOR GASSING TIME | | |
|---|---|---|---|
| BINDER | 30S | 60S | 120S |
| 1 | 14.3 | 16.5 | 18.7 |
| 6 | 17.8 | 20.5 | 22.9 |
| 7 | 20.5 | 21.5 | 22.6 |
| 8 | 18.2 | 19.3 | 21.2 |
| 9 | 19.3 | 21.4 | 22.6 |

TABLE 4

| | COMPRESSION STRENGTH (kg/cm²) AFTER DRY STORAGE FOR GASSING TIME | | | COMPRESSION STRENGTH (kg/cm²) AFTER HUMID STORAGE FOR GASSING TIME | | |
|---|---|---|---|---|---|---|
| BINDER | 30S | 60S | 120S | 30S | 60S | 120S |
| 1 | 20.2 | 22.2 | 21.1 | 18.8 | 20.7 | 20.5 |
| 6 | 26.2 | 25.2 | 25.8 | 20.8 | 21.6 | 20.8 |
| 7 | 31.5 | 32.0 | 31.9 | 26.0 | 26.4 | 26.6 |
| 8 | 32.4 | 34.1 | 34.3 | 26.9 | 26.6 | 28.9 |
| 9 | 39.5 | 40.0 | 41.0 | 32.7 | 31.4 | 31.5 |

The as-gassed strengths obtained at the 5% by weight addition level were similar to those obtained at the 2% by weight addition level, but the strength of cores which had been stored was improved at the 5% level compared with the 2% level. Diethylene glycol monomethyl ether again gave better results than the monoethylene glycol monoalkyl ethers.

EXAMPLE 3

Using the base binder 1 of Example 1 a series of binders 10–12 was prepared containing 98% by weight of base binder 1 and 2% by weight of an ethylene glycol monoalkyl ether as follows:

| Binder | Ethylene glycol monoalkyl ether |
|---|---|
| 10 | Diethylene glycol monoethyl ether |
| 11 | Triethylene glycol monomethyl ether |
| 12 | Polyethylene glycol monomethyl ether (Molecular weight 350) |

The binders were tested and compared with Binder 1 as described in Example 1 except that the cores were stored for 24 hours instead of 3 days. The sand temperature was 19° C., the dry storage conditions were 18°-20° C. and 30-35% relative humidity and the humid storage conditions were 24°-26° C. and 90-95% relative humidity.

The results obtained are tabulated in Tables 5 and 6 below.

TABLE 5

| BINDER | COMPRESSION STRENGTH (kg/cm$^2$) FOR GASSING TIME | | |
|---|---|---|---|
| | 30S | 60S | 120S |
| 1 | 13.1 | 14.7 | 17.5 |
| 10 | 16.2 | 19.8 | 23.8 |
| 11 | 15.8 | 19.6 | 21.6 |
| 12 | 11.4 | 13.5 | 17.9 |

TABLE 6

| BINDER | COMPRESSION STRENGTH (kg/cm$^2$) AFTER DRY STORAGE FOR GASSING TIME | | | COMPRESSION STRENGTH (kg/cm$^2$) AFTER HUMID STORAGE FOR GASSING TIME | | |
|---|---|---|---|---|---|---|
| | 30S | 60S | 120S | 30S | 60S | 120S |
| 1 | 21.0 | 21.3 | 20.6 | 15.7 | 15.9 | 16.8 |
| 10 | 34.0 | 36.0 | 35.3 | 21.8 | 24.2 | 25.6 |
| 11 | 28.4 | 34.0 | 35.5 | 20.0 | 23.5 | 24.7 |
| 12 | 23.0 | 26.3 | 27.4 | 21.0 | 21.3 | 21.0 |

The polyethylene glycol monomethyl ether gave little or no improvement in as-gassed strength but the strength of stored cores was improved. The results show that for overall improvements in core strength relatively short chain length ethylene glycol monoalkyl ethers are preferable.

EXAMPLE 4

Using the base binder 1 of Example 1 two binders, 13 and 14, were prepared containing respectively 5% by weight of diethylene glycol monoethyl ether and 5% by weight triethylene glycol monomethyl ether.

Binders 13 and 14 were compared with binder 1 using the procedure of Example 1. Test cores were stored for 4 days and the test conditions were as set out in Example 3.

The results obtained are tabulated in Table 7 below.

TABLE 7

| BINDER GASSING TIME | COMPRESSION STRENGTH (kg/cm$^2$) | | |
|---|---|---|---|
| | 1 | 13 | 14 |
| AS GASSED | | | |
| 30S | 13.3 | 17.5 | 15.9 |
| 60S | 15.4 | 19.0 | 17.9 |
| 120S | 18.0 | 20.5 | 19.8 |
| DRY STORAGE | | | |
| 30S | 16.8 | 48.0 | 44.0 |
| 60S | 21.7 | 48.0 | 49.0 |
| 120S | 24.1 | 48.5 | 47.0 |
| HUMID STORAGE | | | |
| 30S | 15.8 | 25.5 | 26.1 |
| 60S | 16.4 | 25.3 | 26.2 |
| 120S | 16.0 | 27.3 | 24.1 |

The results show that at the 5% by weight addition level diethylene glycol monoethyl ether and triethylene glycol monomethyl ether give particularly high strengths on dry storage of the cores, and also significant improvements in strength on humid storage of the cores.

EXAMPLE 5

A series of binders 15-30 was prepared from base binder 1 containing various proportions of various ethylene glycol monoalkyl ethers as follows:

| Binder | Ethylene glycol monoalkyl ether | Amount (WT) |
|---|---|---|
| 15 | Diethylene glycol monomethyl ether | 2% |
| 16 | Diethylene glycol monomethyl ether | 4% |
| 17 | Diethylene glycol monomethyl ether | 7.5% |
| 18 | Diethylene glycol monomethyl ether | 10% |
| 19 | Diethylene glycol monoethyl ether | 2% |
| 20 | Diethylene glycol monoethyl ether | 4% |
| 21 | Diethylene glycol monoethyl ether | 7.5% |
| 22 | Diethylene glycol monoethyl ether | 10% |
| 23 | Diethylene glycol monobutyl ether | 2% |
| 24 | Diethylene glycol monobutyl ether | 4% |
| 25 | Diethylene glycol monobutyl ether | 7.5% |
| 26 | Diethylene glycol monobutyl ether | 10% |
| 27 | Triethylene glycol monomethyl ether | 2% |
| 28 | Triethylene glycol monomethyl ether | 4% |
| 29 | Triethylene glycol monomethyl ether | 7.5% |
| 30 | Triethylene glycol monomethyl ether | 10%. |

Binders 15-30 were tested using the procedure of Example 1. The test conditions and the results obtained are tabulated in Tables 8, 9 and 10 below.

TABLE 8

| BINDERS | CONDITIONS | COMPRESSION STRENGTH (kg/cm$^2$) FOR GASSING TIME | | |
|---|---|---|---|---|
| | | 30S | 60S | 120S |
| 15 | Sand Temp 19° C. | 15.2 | 18.0 | 21.2 |
| 16 | | 15.8 | 18.6 | 23.1 |
| 17 | | 11.9 | 13.9 | 16.3 |
| 18 | | 9.5 | 12.7 | 14.6 |
| 19 | Sand Temp 17° C. | 13.4 | 17.4 | 21.5 |
| 20 | | 15.0 | 18.3 | 21.2 |
| 21 | | 12.8 | 14.9 | 17.0 |
| 22 | | 10.7 | 14.3 | 15.6 |
| 23 | Sand Temp 18° C. | 15.6 | 17.6 | 20.6 |
| 24 | | 17.2 | 20.0 | 22.5 |
| 25 | | 15.1 | 17.4 | 18.6 |
| 26 | | 10.9 | 13.9 | 16.9 |
| 27 | Sand Temp 17-18° C. | 13.1 | 16.5 | 19.2 |
| 28 | | 15.1 | 18.5 | 22.7 |
| 29 | | 13.4 | 15.1 | 17.3 |
| 30 | | 10.1 | 13.1 | 15.9 |

TABLE 9

| BINDER | CONDITIONS | COMPRESSION STRENGTH (kg/cm$^2$) AFTER DRY STORAGE FOR GASSING TIME | | |
|---|---|---|---|---|
| | | 30S | 60S | 120S |
| 15 | Sand Temp 19° C. | 26.0 | 30.0 | 32.1 |
| 16 | Storage Temp 18-20° C. | 30.0 | 31.2 | 34.0 |
| 17 | | 29.7 | 32.5 | 33.0 |
| 18 | Relative Humidity 40-45% | 29.2 | 31.7 | 29.0 |
| 19 | Sand Temp 17° C. | 31.0 | 29.7 | 32.0 |
| 20 | Storage Temp 17-19° C. | 31.1 | 32.6 | 34.0 |
| 21 | Relative Humidity 45-50% | 34.0 | 33.0 | 34.0 |
| 22 | | 27.8 | 32.3 | 33.6 |
| 23 | Sand Temp 18° C. | 28.0 | 29.2 | 29.8 |
| 24 | Storage Temp 18-20° C. | 35.0 | 34.5 | 34.5 |
| 25 | Relative Humidity 40-45% | 24.0 | 30.0 | 31.2 |
| 26 | | 31.0 | 29.5 | 31.5 |
| 27 | Sand Temp 17-18° C. | 27.0 | 27.1 | 28.5 |
| 28 | Storage Temp 17-19° C. | 32.0 | 31.6 | 35.5 |
| 29 | Relative Humidity 40-45% | 34.0 | 35.0 | 34.5 |
| 30 | | 30.0 | 33.0 | 39.0 |

TABLE 10

| BINDER | CONDITIONS | COMPRESSION STRENGTH (kg/cm²) HUMID STORAGE FOR GASSING TIME | | |
|---|---|---|---|---|
| | | 30S | 60S | 120S |
| 15 | Sand Temp 18–20° C. | 25.0 | 25.8 | 28.9 |
| 16 | Storage Temp 26–28° C. | 26.0 | 27.7 | 27.4 |
| 17 | Relative Humidity | 26.4 | 26.2 | 28.0 |
| 18 | 65–70% | 28.0 | 27.1 | 28.6 |
| 19 | Sand Temp 17° C. | 21.6 | 21.2 | 23.4 |
| 20 | Storage Temp 26–28° C. | 24.5 | 25.2 | 25.8 |
| 21 | Relative Humidity | 25.0 | 25.5 | 26.4 |
| 22 | 85–90% | 24.9 | 25.9 | 25.4 |
| 23 | Sand Temp 18° C. | 22.0 | 22.2 | 20.8 |
| 24 | Storage Temp 25–26° C. | 26.0 | 26.6 | 27.3 |
| 25 | Relative Humidity | 28.5 | 29.3 | 29.7 |
| 26 | 75–85% | 27.5 | 27.4 | 28.2 |
| 27 | Sand Temp 17–18° C. | 20.8 | 22.0 | 23.2 |
| 28 | Storage Temp 25–26° C. | 24.0 | 25.2 | 25.9 |
| 29 | Relative Humidity | 24.6 | 25.9 | 25.5 |
| 30 | 80–95% | 25.9 | 26.0 | 26.0 |

The results show that for all the additives the optimum amount for gassed strength improvement is about 4% by weight. Although gassed strength tends to decrease as the amount of additive is increased to 7.5 to 10% by weight, cores still have good storage properties at these high addition levels. The diethylene glycol monobutyl ether gave a somewhat sticky sand composition and for that reason would be less suitable than the other additives.

We claim:

1. A binder composition for forming foundry molds or cores comprising an alkaline aqueous solution of a resol phenol-aldehyde resin and an oxyanion which can form a stable complex with the resin, the amount of alkali present in the solution being sufficient to solubilize the resin and to substantially prevent stable complex formation between the resin and the oxyanion wherein the molar ratio of alkali to phenol is from 1.5:1 to 2.5:1 and the binder composition also contains an ethylene glycol monoalkyl ether in an amount sufficient to improve foundry mold or core strength immediately after gassing with carbon dioxide and after storage.

2. A binder composition according to claim 1 wherein the ethylene glycol monoalkyl ether is ethylene glycol monomethyl ether, ethylene glycol monoethyl ether, ethylene glycol monobutyl ether, diethylene glycol monomethyl ether, diethylene glycol monoethyl ether diethylene glycol monobutyl ether, triethylene glycol monomethyl ether or a polyethylene glycol monomethyl ether.

3. A binder composition according to claim 1 wherein the ethylene glycol monoalkyl ether is present in an amount of 1% to 10% by weight based on the weight of the binder composition.

4. A binder composition according to claim 3 wherein the ethylene glycol monoalkyl ether is present in an amount of 2% to 5% by weight based on the weight of the binder composition.

5. A binder composition according to claim 1 wherein the composition contains in addition a silane.

6. A binder composition according to claim 5 wherein the silane is gammaaminopropyltriethoxysilane N-(2-aminoethyl)-3-aminopropyltrimethoxysilane, phenol trimethyoxysilane or gammaglycidoxypropyltrimethoxysilane.

7. A binder composition according to claim 5 wherein the amount of silane present is from 0.25% to 1.0% by weight based on the weight of the binder composition.

8. A binder composition according to claim 1 wherein the oxyanion is borate.

9. A process for the production of a mold or core of bonded particulate material, comprising the steps of:
   (i) forming a mixture of a binder and particulate material to a desired shape, the binder comprising: an alkaline aqueous solution of a resol phenolaldehyde resin having an alkali to phenol molar ratio of from 1.5:1 to 2.5:1; an oxyanion which can form a stable complex with the resin; and an ethylene glycol monoalkyl ether; the amount of alkali present in the solution being sufficient to solubilise the resin and to substantially prevent stable complex formation between the resin and the oxyanion and the amount of ethylene glycol monoalkyl ether being sufficient to improve foundry mold or core strength immediately after gassing with carbon dioxide and after storage
   (ii) passing carbon dioxide gas through the formed shape so as to cause the oxyanion to form a stable complex with the resin; and
   (iii) curing the resin to form a mold or core of bonded particulate material.

10. A process according to claim 9 wherein the oxyanion is a borate.

11. A process according to claim 9 wherein the carbon dioxide gas is passed through the formed shape at various times.

12. A process according to claim 9 wherein the carbon dioxide gas is passed through the formed shape at a pressure of about 0.35 kg/cm².

13. A binder composition for forming foundry molds and cores, comprising: an oxyanion; an alkaline aqueous solution of a resol phenol-aldehyde resin in a molar ratio of alkali to phenol in the range of 1.5:1 to 2.5:1 and the alkali being present in an amount to solubilise the resin and to substantially prevent the formation of stable complexes between the resin and the oxyanion; an ethylene glycol monoalkyl ether in an amount sufficient to improve foundry mold or core strength immediately after gassing with carbon dioxide and after storage; and wherein the binder composition produces foundry molds and cores having improved strength, surface finish and edge hardness.

14. A binder composition according to claim 13 wherein the ethylene glycol monoalkyl ether is present in an amount of 1 to 10% by weight of the binder composition.

* * * * *